United States Patent
De Jong et al.

(10) Patent No.: US 9,163,172 B2
(45) Date of Patent: Oct. 20, 2015

(54) DEICING COMPOSITION

(75) Inventors: Edwin Ronald De Jong, Deventer (NL); Wasil Maslow, Deventer (NL); René Lodewijk Maria Demmer, Enter (NL)

(73) Assignee: AKZO NOBEL CHEMICALS INTERNATIONAL B.V., Amersfoort (NL)

( * ) Notice: Subject to any disclaimer, the term of this patent is extended or adjusted under 35 U.S.C. 154(b) by 0 days.

(21) Appl. No.: 14/122,926

(22) PCT Filed: Jun. 5, 2012

(86) PCT No.: PCT/EP2012/060543
§ 371 (c)(1),
(2), (4) Date: Nov. 27, 2013

(87) PCT Pub. No.: WO2012/168206
PCT Pub. Date: Dec. 13, 2012

(65) Prior Publication Data
US 2014/0091252 A1    Apr. 3, 2014

Related U.S. Application Data

(60) Provisional application No. 61/494,634, filed on Jun. 8, 2011.

(30) Foreign Application Priority Data

Jun. 8, 2011 (EP) ..................................... 11169045

(51) Int. Cl.
*C09K 3/18* (2006.01)

(52) U.S. Cl.
CPC .. *C09K 3/185* (2013.01); *C09K 3/18* (2013.01)

(58) Field of Classification Search
CPC .................................. C09K 3/18; C09K 3/185
USPC ............................................... 252/70; 106/13
See application file for complete search history.

(56) References Cited

U.S. PATENT DOCUMENTS

| | | |
|---|---|---|
| 4,824,588 A | 4/1989 | Lin |
| 5,135,674 A | 8/1992 | Kuhajek et al. |
| 5,635,101 A | 6/1997 | Janke et al. |
| 5,674,428 A | 10/1997 | Lott et al. |
| 5,709,812 A | 1/1998 | Janke et al. |
| 5,709,813 A | 1/1998 | Janke et al. |
| 5,922,240 A | 7/1999 | Johnson et al. |
| 5,942,150 A | 8/1999 | Heuer et al. |
| 5,965,058 A | 10/1999 | Janke et al. |
| 6,080,330 A | 6/2000 | Bloomer |
| 6,149,834 A | 11/2000 | Gall et al. |
| 6,299,793 B1 | 10/2001 | Hartley et al. |
| 6,440,325 B1 | 8/2002 | Hartley et al. |
| 6,506,318 B1 * | 1/2003 | Sapienza et al. ................. 252/70 |
| 6,582,622 B1 | 6/2003 | Hartley et al. |
| 6,593,468 B1 | 7/2003 | Lange et al. |
| 6,596,188 B1 | 7/2003 | Hartley et al. |
| 6,641,753 B1 | 11/2003 | Bloomer |
| 6,770,217 B2 | 8/2004 | Hartley et al. |
| 6,861,009 B1 | 3/2005 | Leist |
| 7,758,769 B2 * | 7/2010 | Sheen et al. ..................... 252/70 |
| 7,854,856 B2 | 12/2010 | Sapienza et al. |
| 2003/0205693 A1 | 11/2003 | Hartley et al. |
| 2003/0209690 A1 | 11/2003 | Hartley et al. |
| 2003/0213933 A1 | 11/2003 | Hartley et al. |
| 2005/0017214 A1 | 1/2005 | Hartley et al. |
| 2005/0031770 A1 | 2/2005 | Knauf |
| 2006/0175574 A1 | 8/2006 | Bytnar |
| 2006/0202156 A1 | 9/2006 | Sapienza et al. |
| 2007/0278446 A1 | 12/2007 | Koefod |
| 2008/0128651 A1 | 6/2008 | Ossian et al. |
| 2009/0026411 A1 * | 1/2009 | Sheen et al. ..................... 252/70 |
| 2009/0314983 A1 * | 12/2009 | Sapienza et al. ................. 252/70 |
| 2010/0327215 A1 | 12/2010 | Boluk |
| 2011/0000081 A1 | 1/2011 | Lee et al. |
| 2011/0024673 A1 * | 2/2011 | Sapienza et al. ................. 252/70 |
| 2014/0091252 A1 | 4/2014 | De Jong et al. |
| 2014/0284518 A1 | 9/2014 | Maslow et al. |

FOREIGN PATENT DOCUMENTS

| | | |
|---|---|---|
| CN | 1344774 A | 4/2002 |
| CN | 1678709 A | 10/2005 |
| CN | 1735673 A | 2/2006 |
| CN | 101665338 A | 3/2010 |
| EP | 180568 | 5/1986 |
| EP | 404374 | 12/1990 |

(Continued)

OTHER PUBLICATIONS

Sikkema, D. J. et al, Macromolecules, 1989, vol. 22, pp. 364-366.
International Search Report and Written Opinion for International Application No. PCT/EP2012/060542 mailed on Jul. 4, 2012.
International Preliminary Report on Patentability for International Application No. PCT/EP2012/060542 mailed on May 29, 2013.
International Search Report and Written Opinion for International Application No. PCT/EP2012/060543 mailed on Jul. 4, 2012.
International Preliminary Report on Patentability for International Application No. PCT/EP2012/060543 mailed on Jun. 28, 2013.
Office Action from New Zealand Application No. 617459, dated on Sep. 9, 2014.
Japanese Office Action from Japanese Patent Application No. 2014-514028, received on Dec. 16, 2014 (English-language translation of Office Action Report and Office Action in Japanese).

(Continued)

*Primary Examiner* — Anthony J Green
(74) *Attorney, Agent, or Firm* — Kenyon & Kenyon LLP

(57) ABSTRACT

The present invention relates to a deicing composition comprising (i) a deicing agent selected from the group consisting of sodium chloride, calcium magnesium acetate, calcium chloride, magnesium chloride, potassium chloride, potassium acetate, sodium acetate, sodium formate, potassium formate, (ii) a native protein, and (iii) a molasses. It furthermore relates to a process for preparing said deicing composition and to a process for deicing a surface using said deicing composition.

20 Claims, 5 Drawing Sheets

(56) References Cited

FOREIGN PATENT DOCUMENTS

| EP | 1862522 | 12/2007 |
|---|---|---|
| JP | A-S62-089785 | 10/1985 |
| JP | A-S61-108686 | 5/1986 |
| JP | A-S63-097683 | 10/1986 |
| JP | A-H03-065185 | 3/1991 |
| JP | A-H09-048961 | 8/1995 |
| JP | A-H11-035927 | 7/1997 |
| JP | A-2000-034472 | 7/1998 |
| JP | A-2001-187881 | 11/1999 |
| JP | 2000-515900 | 11/2000 |
| JP | A-2001-510490 | 7/2001 |
| JP | A-2004-269631 | 3/2003 |
| JP | A-2004-510031 | 4/2004 |
| JP | A-2006-199803 | 1/2005 |
| JP | 2005-533891 | 11/2005 |
| JP | 2006-501322 | 1/2006 |
| JP | A-2007-525959 | 9/2007 |
| JP | A-2007-327054 | 12/2007 |
| JP | A-2008-508302 | 3/2008 |
| JP | A-2012-531478 | 6/2009 |
| JP | A-2013-506753 | 2/2013 |
| WO | 97/07178 | 2/1997 |
| WO | 97/26309 | 7/1997 |
| WO | 97/34960 | 9/1997 |
| WO | 99/20657 | 4/1999 |
| WO | 00/50531 | 8/2000 |
| WO | 02-26910 | 4/2002 |
| WO | 2004/009727 | 1/2004 |
| WO | 2004-013250 | 2/2004 |
| WO | 2004063154 | 7/2004 |
| WO | 2004-112490 | 12/2004 |
| WO | 2006-015120 | 2/2006 |
| WO | 2011000081 | 1/2011 |
| WO | 2011/044135 | 4/2011 |

OTHER PUBLICATIONS

Japanese Office Action from Japanese Patent Application No. 2014-514029, received on Dec. 16, 2014 (English-language translation of Office Action Report and Office Action in Japanese).
Abstract of the Journal of Dairy Research, vol. 55, Issue 03, Aug. 1988, pp. 443-448.
International Search Report for International Application No. PCT/EP2012/071678, mailed on Feb. 7, 2013.
International Preliminary Report on Patentability for International Application No. PCT/EP2012/071678, mailed on Feb. 11, 2014.
European Search Report for European Application No. EP 11188481.3, completed Mar. 26, 2012.
CROW publication 146a, 2005. Corresponds to new version CROW Handboek visuele inspectie 2011 as provided. Cited and described in the specification for US 2014-0284518, paragraph 0071.
Derwent-Acc-No: 2010-D19617, abstract of Chinese Patent Specification No. CN 101665338 A (Mar. 2010).
Fly Ash, http://en.wikipedia.org/wiki/Fly_ash (last visited Dec. 10, 2014).
Plaster, http://en.wikipedia.org/wiki/Plaster (last visited Dec. 10, 2014).
Slag, http://en.wikipedia.org/wiki/Slag (last visited Dec. 10, 2014).
Lime plaster, http://en.wikipedia.org/wiki/Lime_plaster (last visited Dec. 10, 2014).
Whey, http://en.wikipedia.org/wiki/Whey (last visited Oct. 9, 2014).
Niro Inc., Filtration Division, Concentration of the Raffinate Fraction from Beet Molasses Desugarization Chromatographic Separators, Hudson, Wisconsin, as accessed on http://www.niroinc.com/filtration/filtration_literature.asp (last visited Feb. 17, 2015).
Chinese Office Action from Chinese Patent Application No. 2012-0026167.4, issued on Dec. 18, 2014 (English-language translation of Office Action).
Chinese Office Action from Chinese Patent Application No. 2012-80055086.7, issued on Mar. 30, 2015. (English language translation provided.).
Chinese Office Action from Chinese Patent Application No. 2012-0026167.4, issued on Dec. 18, 2014 (Englishlanguage translation of Office Action).
Eurasian Office Action from Eurasian Patent Application No. 2013-91745, issued on Nov. 21, 2014 (English-language translation of Office Action).
Eurasian Office Action from Eurasian Patent Application No. 2013-91746, issued on Nov. 21, 2014 (English-language translation of Office Action).
Japanese Office Action from Japanese Patent Application No. 2014-514028, mailed on Dec. 16, 2014.
Japanese Office Action from Japanese Patent Application No. 2014-514029, mailed on Dec. 16, 2014.

* cited by examiner

DEICING COMPOSITION

REFERENCE TO RELATED APPLICATIONS

This application is the U.S. National Phase of PCT/EP2012/060543 filed on Jun. 5, 2012, and claims the benefit of EP Application No. 11169045.9, filed on Jun. 8, 2011, and U.S. Application No. 61/494,634, filed on Jun. 8, 2011.

The present invention relates to a deicing composition and to a process for the preparation of said deicing composition. It furthermore relates to a process for deicing a surface and to a kit of parts for use in said process. Finally, it relates to the use of a combination of a native protein and a molasses for improving the efficiency of a deicing composition.

Wintry conditions provide inconveniences to roads and traffic in the form of snow or black ice. Obviously, eliminating snow, frost, and ice of roads and highways has enormous benefits for the safety. Sodium chloride (NaCl) is commonly used to control snow and ice formation on roadways, highways, and sidewalks. The sodium chloride works as a deicing agent by dissolving into precipitation on roadways and lowering the freezing point, thereby melting ice and snow. Other salts that can be used as deicers include for example calcium chloride and magnesium chloride. These compounds depress the freezing point of water to an even lower temperature than sodium chloride. Also potassium chloride is sometimes used as a deicer. Another, commonly known alternative to road salt is calcium magnesium acetate. Other, less known deicer salts include potassium acetate, sodium acetate, sodium formate, and potassium formate.

The wintry conditions also create damage to asphalt, bituminous, and concrete surfaces. These surfaces have porous structures. Especially asphalt comprises a number of subsurface channels. When the air/ground temperature becomes sufficiently low, an aqueous solution which is present in the channels of the asphalt will expand upon freezing, thus, creating mechanical stress in the asphalt. Especially after repeated freezing and thawing, the asphalt will break, resulting in potholes. Not only large sums of money have to be spent each year to repair damaged roadways and highways, potholes may also result in dangerous situations for traffic. Furthermore, the additional maintenance required will result in additional traffic jams.

The problem of damage to roadways and highways because of the expansion and contraction of water or water-based solutions during freezing and thawing cycles has become an even bigger issue since the introduction of a new type of asphalt, the so-called highly porous asphalt in the nineties. This highly porous asphalt concrete may comprise up to 20% of hollow space. This has the advantage that rain and melt water will flow away quickly from the asphalt surface through the subsurface channels into the soil. The asphalt road surface itself retains practically no moisture, and hence, is not slick and slippery even in case of heavy rainfall. While the use of this type of asphalt has an enormous beneficial effect on safety under rainy conditions, a disadvantage is that under wintry conditions more of the deicing agent is needed in order to keep the roads free of snow and ice during the winter as the deicing agent will also flow away with the melt water from the road surface.

It is an object of the present invention to provide a deicing composition which has improved deicing properties. More particularly, it is an object of the present invention to provide a deicing composition which remains effective over a longer period of time so that the deicing agent can be applied less frequently and the damage to especially highly porous road surfaces will be reduced even after repeated freezing and thawing.

Surprisingly, the objective has been met by adding a combination of two types of additives, viz. a protein and a molasses, to a deicing agent. In more detail, the present invention relates to a deicing composition comprising (i) a deicing agent selected from the group consisting of sodium chloride, calcium magnesium acetate, calcium chloride, magnesium chloride, potassium chloride, potassium acetate, sodium acetate, sodium formate, and potassium formate, (ii) native protein, and (iii) a molasses (with the proviso that components (ii) and (iii) are not the same).

It was found that the deicing composition according to the present invention has an improved performance. It has been found that by using the specific combination of molasses and native protein, the deicing agent will remain active over a longer period of time. Furthermore, due to better adhesion properties of the deicing composition compared to use of the deicing agent alone, less deicing agent will be blown away and the deicing agent is retained on the road for a longer period of time.

In addition, it was found that the use of the deicing composition according to the present invention reduces damage to road surfaces after repeated freezing and thawing.

The deicing composition according to the present invention has been found to be less corrosive than conventional deicing compositions.

Figure 1:
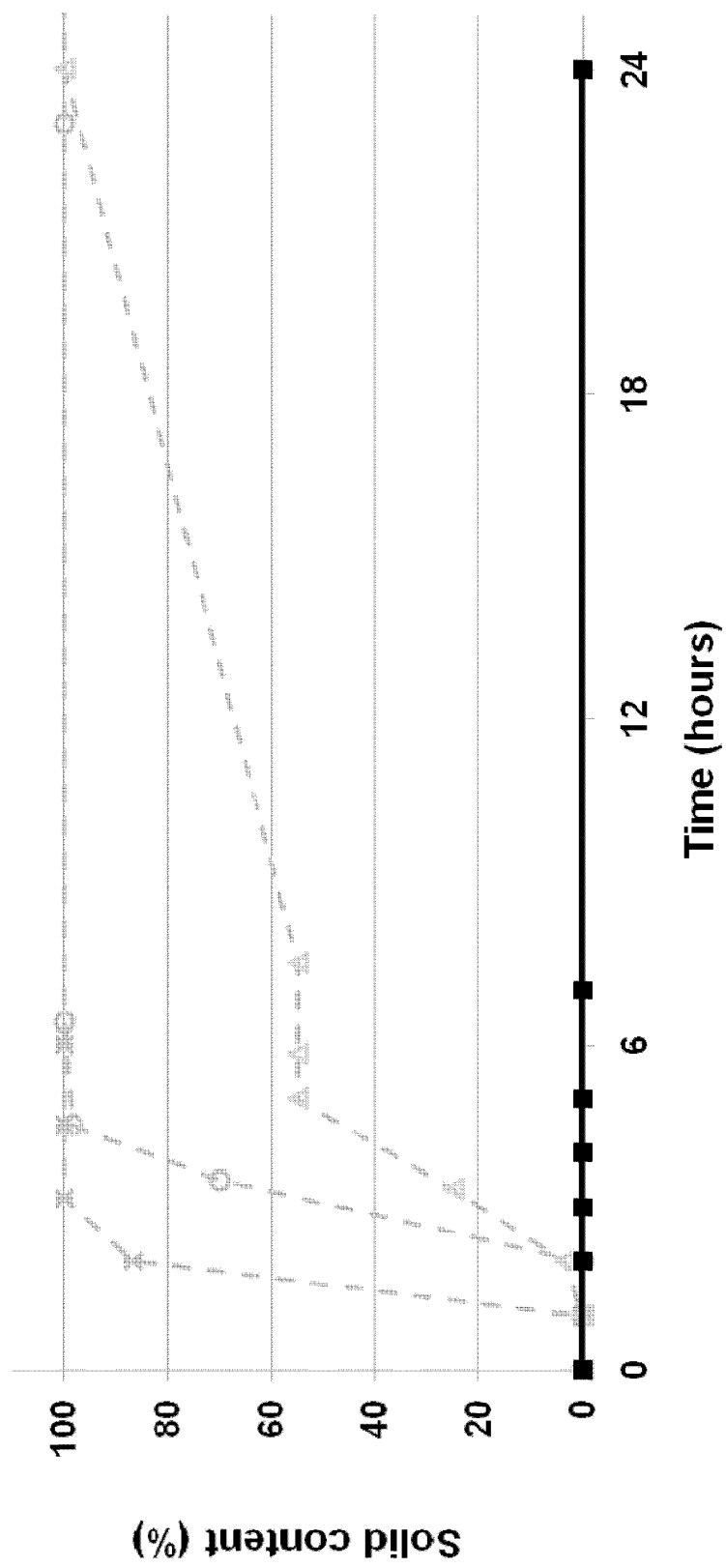
FIG. 1 is a graph showing the solid content as a function of time for Comparative Examples A, F and K, and Example 8.

The deicing agent present in the deicing composition according to the present invention is selected from the group consisting of sodium chloride, calcium magnesium acetate, calcium chloride, magnesium chloride, potassium chloride, potassium acetate, sodium acetate, sodium formate, and potassium formate. Preferably, however, the deicing agent is a chloride salt, i.e. it is preferably selected from the group consisting of sodium chloride, calcium chloride, magnesium chloride, and potassium chloride. More preferably calcium chloride is used as the deicing agent in the compositions according to the present invention. Most preferably, sodium chloride is used as the deicing agent in the compositions according to the present invention as it is cheap and available in large quantities.

If the deicing composition is an aqueous composition, the deicing agent is preferably present in an amount of at least 5% by weight, more preferably at least 10% by weight and most preferably at least 20% by weight (based on the total weight of the deicing composition). Preferably, such aqueous deicing composition comprises at most the saturation concentration of the deicing agent. The deicing composition according to the present invention can also be in the form of a slurry, containing deicing agent at concentrations higher than the saturation concentration. If the deicing composition is in the form of a solid, it may comprise as little as 5% by weight of deicing agent (based on the total weight of the deicing composition), if it is, for example, mixed with gritting material like sand. However, preferably, the deicing composition according to the present invention comprises at least 50% by weight of the deicing agent, yet more preferably at least 70% by weight, and most preferably at least 96% by weight of the deicing agent (based on the total weight of the deicing composition).

The protein present in the deicing composition according to the present invention is a protein which is in its native form. In other words, it is a non-denatured protein. As the skilled person knows, proteins (or rather polypeptides in general) can lose their secondary and tertiary structure if exposed to chemical, physical, or mechanical stress, such as a strong acid or base, urea, an organic solvent or heat. Proteins that are denatured under such harmful circumstances are no longer suitable for use in the deicing composition according to the present invention as they have lost their effectiveness. Accordingly, with the terms "native protein" and "protein in its natural state" it is meant that the protein has not been altered under denaturing conditions such as heat, chemicals, enzyme action or the exigencies of extraction.

For the sake of clarity it is noted that the protein is not a protein as present in molasses.

The protein suitable for use in the composition according to the present invention is preferably a protein selected from the group consisting of soy based proteins, dairy based proteins, egg proteins and combinations thereof. In one embodiment, for example, the protein is spray dried egg white powder or yolk from eggs, or mixtures thereof.

The protein is typically present in the deicing composition according to the present invention in an amount at least 10 ppm, more preferably at least 100 ppm and most preferably at least 500 ppm. It is preferably present in an amount of less than 10.000 ppm, more preferably in an amount of less than 8.000 ppm and most preferably, in an amount of less than 5.000 ppm. The protein concentrations are expressed in ppm, herewith defined as mg protein per kg of the total deicing composition.

The molasses to be present in the deicing composition according to the present invention can be any molasses conventionally used for deicing purposes. It is noted that it is possible to use molasses which have been subjected to one or more purification steps, such as the removal of sulphites, sulphur dioxide, ash, microbial life forms or other insolubles as removal of these contaminants does not have an adverse effect on the performance in the deicing composition. It is furthermore noted that it is possible to use chemically, biologically, physically or otherwise treated molasses, such as, but not exclusively, desugared beet molasses, acid/base treated molasses, carboxylated molasses (wherein the sugars present in molasses are carboxylated with conventional techniques), and molasses containing one or more additives. Preferably, the molasses is selected from the group consisting of molasses derived from corn (syrup), molasses derived from sugar beet, molasses derived from sugar cane and molasses derived from grapes.

The term "molasses" includes all the above types of treated or untreated molasses.

Preferably, the molasses is beet or cane sugar molasses containing between 20 and 80 wt % sugars, yet more preferably containing between 40 and 60 wt % sugars, most preferably between 45 and 55 wt % sugars.

The molasses is typically present in the deicing composition according to the present invention in an amount at least 10 ppm, more preferably at least 100 ppm and most preferably at least 500 ppm. It is preferably present in an amount of less than 50.000 ppm, more preferably in an amount of less than 10.000 ppm and most preferably, in an amount of less than 5.000 ppm.

The molasses concentrations are expressed in ppm, herewith defined as mg molasses per kg of the total deicing composition.

The present invention furthermore relates to a process for preparing the deicing composition according to the present invention. Said process of spraying an aqueous treatment solution comprising a native protein and a molasses, onto a deicing agent selected from the group consisting of sodium chloride, calcium magnesium acetate, calcium chloride, magnesium chloride, potassium chloride, potassium acetate, sodium acetate, sodium formate, and potassium formate. Preferably, the aqueous treatment solution is sprayed onto the deicing agent in an amount so that the resulting deicing composition will comprise at least 10 ppm, more preferably at least 100 ppm and most preferably at least 500 ppm of the protein and at least 10 ppm, more preferably at least 100 ppm and most preferably at least 500 ppm of the molasses. Preferably, the resulting deicing composition comprises no more than 10.000 ppm, more preferably no more than 8.000 ppm and most preferably, no more than 5.000 ppm of the protein. Preferably, the resulting deicing composition comprises no more than 50.000 ppm, more preferably no more than 10.000 ppm and most preferably, no more than 5.000 ppm of the molasses.

As described above, the protein is preferably selected from the group consisting of soy based proteins, dairy based proteins, egg proteins and combinations thereof. The molasses is preferably selected from the group consisting of molasses derived from corn (syrup), molasses derived from sugar beet and molasses derived from grapes.

As mentioned above, the protein and the molasses are two different compounds. Said protein is a native protein and differs from any protein that might be present in molasses.

The present invention furthermore relates to a process for deicing a surface. Said surface can be deiced in various ways.

In one embodiment the deicing composition according to the present invention is spread onto said surface.

In another embodiment, the process for deicing a surface comprises the steps of mixing a solid deicing agent selected from the group consisting of sodium chloride, calcium magnesium acetate, calcium chloride, magnesium chloride, potassium chloride, potassium acetate, sodium acetate, sodium formate, and potassium formate with an aqueous treatment solution comprising a native protein and a molasses, and spreading the thus obtained mixture onto said surface. This method is a preferred embodiment since the risk that the deicing composition is blown away is greatly reduced. Furthermore, a better adhesion of the deicing composition to the road surface is attained.

In yet another embodiment, the process for deicing a surface comprises the steps of preparing an aqueous solution comprising between 5% by weight and the saturation concentration of a solid deicing agent selected from the group consisting of sodium chloride, calcium magnesium acetate, calcium chloride, magnesium chloride, potassium chloride, potassium acetate, sodium acetate, sodium formate, and potassium formate; a native protein and a molasses and applying said mixture onto said surface, e.g. by spraying. This method is also a preferred embodiment since the risk that the deicing composition is blown away is also in this method greatly reduced.

Furthermore, a better adhesion of the deicing composition to the road surface is attained.

In yet another embodiment of the present invention, the process for deicing a surface comprises the steps of spreading a deicing agent selected from the group consisting of sodium chloride, calcium magnesium acetate, calcium chloride, magnesium chloride, potassium chloride, potassium acetate, sodium acetate, sodium formate, and potassium formate in solid or aqueous form onto said surface and separately spreading a native protein and a molasses in solid or aqueous form onto said surface.

The surface to be deiced is preferably a surface selected from the group consisting of non-porous asphalt road, asphalt road, porous asphalt road, concrete road, bituminous road, brick road, graveled path, cobbled road, unpaved road, and pavement.

Preferably at least 1 g of deicing agent, at least 0.01 mg of protein and at least 0.01 mg of molasses is introduced per $m^2$ of said surface. Preferably, no more than 50 g of deicing agent is introduced per $m^2$ of surface to be deiced. Preferably, no more than 500 mg of protein and no more than 2500 mg of molasses are introduced per $m^2$ of surface to be deiced.

In yet another aspect of the present invention, it relates to a kit of parts for use in the process for deicing a surface. The kit of parts comprises an anti-icing composition comprising a deicing agent selected from the group consisting of sodium chloride, calcium magnesium acetate, calcium chloride, magnesium chloride, potassium chloride, potassium acetate, sodium acetate, sodium formate, and potassium formate as a component (a) and an aqueous solution comprising between 0% and its saturation concentration of the deicing agent, between 10 ppm and its saturation concentration of the native protein and between 10 ppm and its saturation concentration of the molasses as a component (b). Preferably, component (a) forms between 60 and 99.99% by weight of the kit of parts and component (b) forms between 0.01% and 40% by weight of the kit of parts (with component (a) and (b) adding up to 100%). Component (a) can be in the form of an aqueous solution, a slurry, or a solid (vide supra).

Component (b) can also be a solid mixture of native protein and molasses. Accordingly, the present invention also relates to a kit of parts for use in the process for deicing a surface according to the present invention comprising a anti-icing composition comprising a deicing agent selected from the group consisting of sodium chloride, calcium magnesium acetate, calcium chloride, magnesium chloride, potassium chloride, potassium acetate, sodium acetate, sodium formate, and potassium formate as a component (a) and a solid component comprising a native protein and a molasses as a component (b). Preferably, component (a) forms between 90 and 99.9% by weight of the kit of parts and component (b) forms between 0.1% and 10% by weight of the kit of parts (with component (a) and (b) adding up to 100%). Component (a) can be in the form of an aqueous solution, a slurry, or a solid (vide supra). Preferably, it is in the form of a solid.

Finally, the present invention relates to the use of a combination of a native protein and a molasses for improving the efficiency of a deicing composition comprising a deicing agent selected from the group consisting of sodium chloride, calcium magnesium acetate, calcium chloride, magnesium chloride, potassium chloride, potassium acetate, sodium acetate, sodium formate, and potassium formate, in the deicing of a surface. As said, said surface is preferably selected from the group consisting of non-porous asphalt road, asphalt road, porous asphalt road, concrete road, bituminous road, brick road, graveled path, cobbled road, unpaved road, and pavement.

The present invention is further illustrated by the following non-limiting Examples and Comparative Examples.

EXAMPLES

Materials

| Abbreviation | Material | Origin |
| --- | --- | --- |
| $H_2O$ | Water | Tap water |
| NaCl | NaCl, Sanal P grade | AkzoNobel, Mariager, Denmark |
| RM | Raw Molasses | Suiker Unie, Netherlands |
| SC | Safecote | Safecote Ltd., Northwich, UK |
| EW | spray dried egg white powder | Adriaan Goede BV, Landsmeer, Netherlands |
| EY | Yolk from fresh eggs | — |
| SP | spray dried powder of soy proteins isolate | Lucovitaal, PK Benelux/PharmaCare, Uden NL |
| WP | Whey Protein Concentrate | Springfield Neutraceuticals BV, Oud-Beijerland, Netherlands |

Machines:

| Machine | Settings |
| --- | --- |
| Refrigerator | −29 deg Celsius |

Sample Preparation

In all preparations below, 22 wt-% NaCl brine is referred to as "brine". Possible impurities in the products are not accounted for in the calculation of the final compound concentration; this concentration is defined as the ratio of weighed amount of compound and total mass of the sample. Compound concentrations are expressed in ppm, herewith defined as mg compound/kg total sample mass.

Stock Solutions

All preparations were carried out batch wise. The mentioned amounts represent the typical batch size at which all samples were prepared.

Brine was prepared by the dissolution of 220 g NaCl into 780 g water.

The protein solutions were prepared by the slow addition of protein material to vigorously stirred brine. The brine as stirred by means of a magnetic stirrer. Protein stock solutions contained either 30,000 or 3,000 or 300 ppm protein.

The RM solutions were prepared by careful addition to vigorously stirred brine. The brine was stirred by means of a magnetic stirrer. The stock solutions contained either 3,000 ppm or 30,000 ppm of RM.

The SC stock solutions were prepared by dilution of the commercially available Safecote product with brine.

Final Solutions

The final sample solutions were obtained by mixing the protein and/or molasses stock solutions and the addition of brine. Three examples:

Brine containing 1,000 ppm EW and 1,000 ppm RM: mixing
   10 grams of 3,000 ppm EW stock solution
   10 grams of 3,000 ppm RM stock solution
   10 grams of brine Brine containing 1,000 ppm EY and 10 ppm RM: mixing
   10 grams of 3,000 ppm EY stock solution
   0.1 grams of 3,000 ppm RM stock solution
   19.9 grams of brine Brine containing 10,000 ppm EW and 1,000 ppm SC: mixing
10 grams of 30,000 ppm EW stock solution
10 grams of 3,000 ppm SC stock solution
10 grams of brine All samples were prepared following the above exemplified principle.

All samples had the exact total weight of 30 grams, contained in a Greiner tube (PP, 50 mL, Greiner BioOne).

Experimental Conditions

These Greiner tubes were stored in the fridge for maximum 2 days until the start of the experiment. Upon starting the experiment, the tubes were stored in the freezer at −29° C. and evaluated by eye for their solids content, with an accuracy of 5-10% per sample. The evaluation of solids content was done by eye, implying the estimation of solids content with respect to the total volume of the sample. All samples were prepared in three-fold and the presented solid contents are calculated as the average of all three samples.

Results

Table 1 is a matrix representation of all combinations of proteins and molasses tested at different concentrations. Molasses is arranged horizontally, with the leftmost column showing the samples without molasses. The proteins are arranged vertically, with the uppermost row showing the samples without proteins. In the grey bars, the concentrations of the corresponding additives are given in ppm (mg/kg). All numbers in the white area represent the solids content after 24 hours.

The reference samples containing either a protein or molasses do always show high solids content, although not always 100% solids. However, after longer time all these reference samples completely solidified without exception. All other samples comprising both a protein and molasses do not solidify completely, if at all. In all cases the solid content is much lower than that of their respective references. From this table it can be derived that there is synergy between proteins and molasses.

TABLE 1

|  |  |  | Molasses | | | | |
| --- | --- | --- | --- | --- | --- | --- | --- |
|  |  | ppm | 0 | RM 10 | RM 100 | RM 1000 | RM 10000 |
| Proteins | 0 |  | 100 | 100 | 100 | 100 | 93 |
|  | EW | 10 | 100 | — | — | 27 | — |
|  | EW | 100 | 87 | — | — | 0 | — |
|  | EW | 1000 | 100 | 0 | 0 | 0 | 0 |
|  | EW | 10000 | 100 | — | — | 0 | — |
|  | EY | 1000 | 100 | — | — | 0 | — |
|  | SP | 1000 | 93 | — | — | 0 | — |
|  | WP | 1000 | 90 | — | — | 23 | — |

In Table 2, detailed results of the experiments summarized in Table 1 are shown. For each entry it is mentioned which additives were present and the volume % of solids present in the sample after a certain time (in hours).

TABLE 2

| Ex. | Composition |  | Data | | | | | | | | | | |
| --- | --- | --- | --- | --- | --- | --- | --- | --- | --- | --- | --- | --- | --- |
| A | no additives | Time (h) | 0 | 1 | 2 | 3 | 5 | 6 | 120 | | | | |
|  |  | Solids (%) | 0 | 0 | 87 | 100 | 100 | 100 | 100 | | | | |
| B | 10 ppm EW | Time (h) | 0 | 1 | 2 | 3 | 60 | | | | | | |
|  |  | Solids (%) | 0 | 0 | 100 | 100 | 100 | | | | | | |
| C | 100 ppm EW | Time (h) | 0 | 1 | 2 | 3 | 4 | 5 | 6 | 7 | 24 | 30 | 47 | 55 | 120 |
|  |  | Solids (%) | 0 | 0 | 0 | 10 | 27 | 30 | 37 | 60 | 87 | 87 | 93 | 93 | 93 |
| D | 1000 ppm EW | Time (h) | 0 | 1 | 2 | 3 | 4 | 5 | 6 | 7 | 24 | 30 | 47 | 55 | 120 |
|  |  | Solids (%) | 0 | 0 | 0 | 37 | 43 | 50 | 63 | 88 | 100 | 100 | 100 | 100 | 100 |
| E | 10000 ppm EW | Time (h) | 0 | 1 | 2 | 3 | 60 | | | | | | |
|  |  | Solids (%) | 0 | 0 | 100 | 100 | 100 | | | | | | |
| F | 1000 ppm EY | Time (h) | 0 | 1 | 2 | 3 | 5 | 6 | 8 | 24 | 30 | | | |
|  |  | Solids (%) | 0 | 0 | 3 | 25 | 55 | 55 | 55 | 100 | 100 | | | |
| G | 1000 ppm SP | Time (h) | 0 | 1 | 2 | 3 | 5 | 7 | 23 | 30 | 95 | | | |
|  |  | Solids (%) | 0 | 0 | 0 | 8 | 28 | 60 | 93 | 93 | 93 | | | |
| H | 1000 ppm WP | Time (h) | 0 | 1 | 2 | 3 | 5 | 7 | 23 | 30 | | | | |
|  |  | Solids (%) | 0 | 0 | 27 | 32 | 85 | 85 | 90 | 93 | | | | |
| I | 10 ppm RM | Time (h) | 0 | 1 | 2 | 4 | 21 | 23 | 25 | | | | | |
|  |  | Solids (%) | 0 | 0 | 2 | 7 | 95 | 100 | 100 | | | | | |
| J | 100 ppm RM | Time (h) | 0 | 1 | 2 | 4 | 21 | 23 | 25 | | | | | |
|  |  | Solids (%) | 0 | 0 | 0 | 10 | 100 | 100 | 100 | | | | | |
| K | 1000 ppm RM | Time (h) | 0 | 1 | 2 | 4 | 5 | 6 | 23 | | | | | |
|  |  | Solids (%) | 0 | 0 | 0 | 70 | 98 | 100 | 100 | | | | | |
| L | 10000 ppm RM | Time (h) | 0 | 1 | 2 | 4 | 21 | 23 | 25 | | | | | |
|  |  | Solids (%) | 0 | 0 | 0 | 10 | 83 | 93 | 93 | | | | | |
| 1 | 1000 ppm EW + 10 ppm RM | Time (h) | 0 | 2 | 3 | 4 | 5 | 7 | 24 | | | | | |
|  |  | Solids (%) | 0 | 0 | 0 | 0 | 0 | 0 | 0 | | | | | |
| 2 | 1000 ppm EW + 100 ppm RM | Time (h) | 0 | 2 | 3 | 4 | 5 | 7 | 24 | | | | | |
|  |  | Solids (%) | 0 | 0 | 0 | 0 | 0 | 0 | 0 | | | | | |
| 3 | 1000 ppm EW + 1000 ppm RM | Time (h) | 0 | 1 | 2 | 4 | 5 | 6 | 23 | | | | | |
|  |  | Solids (%) | 0 | 0 | 0 | 0 | 0 | 0 | 0 | | | | | |
| 4 | 1000 ppm EW + 10000 ppm RM | Time (h) | 0 | 2 | 3 | 4 | 5 | 7 | 24 | | | | | |
|  |  | Solids (%) | 0 | 0 | 0 | 0 | 0 | 0 | 0 | | | | | |
| 5 | 10 ppm EW + 1000 ppm RM | Time (h) | 0 | 2 | 3 | 4 | 5 | 7 | 24 | | | | | |
|  |  | Solids (%) | 0 | 0 | 2 | 2 | 2 | 3 | 27 | | | | | |
| 6 | 100 ppm EW + 1000 ppm RM | Time (h) | 0 | 2 | 3 | 4 | 5 | 7 | 24 | | | | | |
|  |  | Solids (%) | 0 | 0 | 0 | 0 | 0 | 0 | 0 | | | | | |
| 7 | 10000 ppm EW + 1000 ppm RM | Time (h) | 0 | 2 | 3 | 4 | 5 | 7 | 24 | | | | | |
|  |  | Solids (%) | 0 | 0 | 0 | 0 | 0 | 0 | 0 | | | | | |

TABLE 2-continued

| Ex. | Composition | | Data | | | | | | |
|---|---|---|---|---|---|---|---|---|---|
| 8 | 1000 ppm EY + | Time (h) | 0 | 2 | 3 | 4 | 5 | 7 | 24 |
|   | 1000 ppm RM | Solids (%) | 0 | 0 | 0 | 0 | 0 | 0 | 0 |
| 9 | 1000 ppm SP + | Time (h) | 0 | 2 | 3 | 4 | 5 | 7 | 24 |
|   | 1000 ppm RM | Solids (%) | 0 | 0 | 0 | 0 | 0 | 0 | 0 |
| 10 | 1000 ppm WP + | Time (h) | 0 | 2 | 3 | 4 | 5 | 7 | 24 |
|   | 1000 ppm RM | Solids (%) | 0 | 0 | 0 | 7 | 7 | 7 | 23 |

In Table 3, the results wherein Safecote was used as the molasses are summarized. This Table shall be interpreted the same way as Table 1. The samples containing only Safecote all fully solidify within 24 hours. The addition of proteins leads to a synergistic effect and none of these samples completely freeze over.

TABLE 3

|  |  | Molasses | | | | |
|---|---|---|---|---|---|---|
|  | ppm | 0 | SC 10 | SC 100 | SC 1000 | SC 10000 |
| Proteins | 0 | 100 | 100 | 100 | 100 | 100 |
|  | EW 10 | 100 | — | — | 0 | — |
|  | EW 100 | 87 | — | — | 0 | — |
|  | EW 1000 | 100 | 0 | 0 | 0 | 0 |
|  | EW 10000 | 100 | — | — | 0 | — |
|  | EY 1000 | 100 | — | — | 27 | — |
|  | SP 1000 | 93 | — | — | 0 | — |
|  | WP 1000 | 90 | — | — | 30 | — |

In Table 4, detailed results of the experiments summarized in Table 3 are listed. For each entry it is mentioned which additives were present and the volume % of solids present in the sample after a certain time (in hours).

FIGS. 1-5 have been added for further illustration. The results of Comparative Examples A, F, and K and Example 8 (see Table 2) can be found in FIG. 1 with

| A | -*- | representing no additives |
| K | -○- | representing 1000 ppm RM |
| D | -Δ- | representing 1000 pm EY |
| 8 | -■- | representing 1000 ppm RM + 1000 ppm EY |

Figure 2:
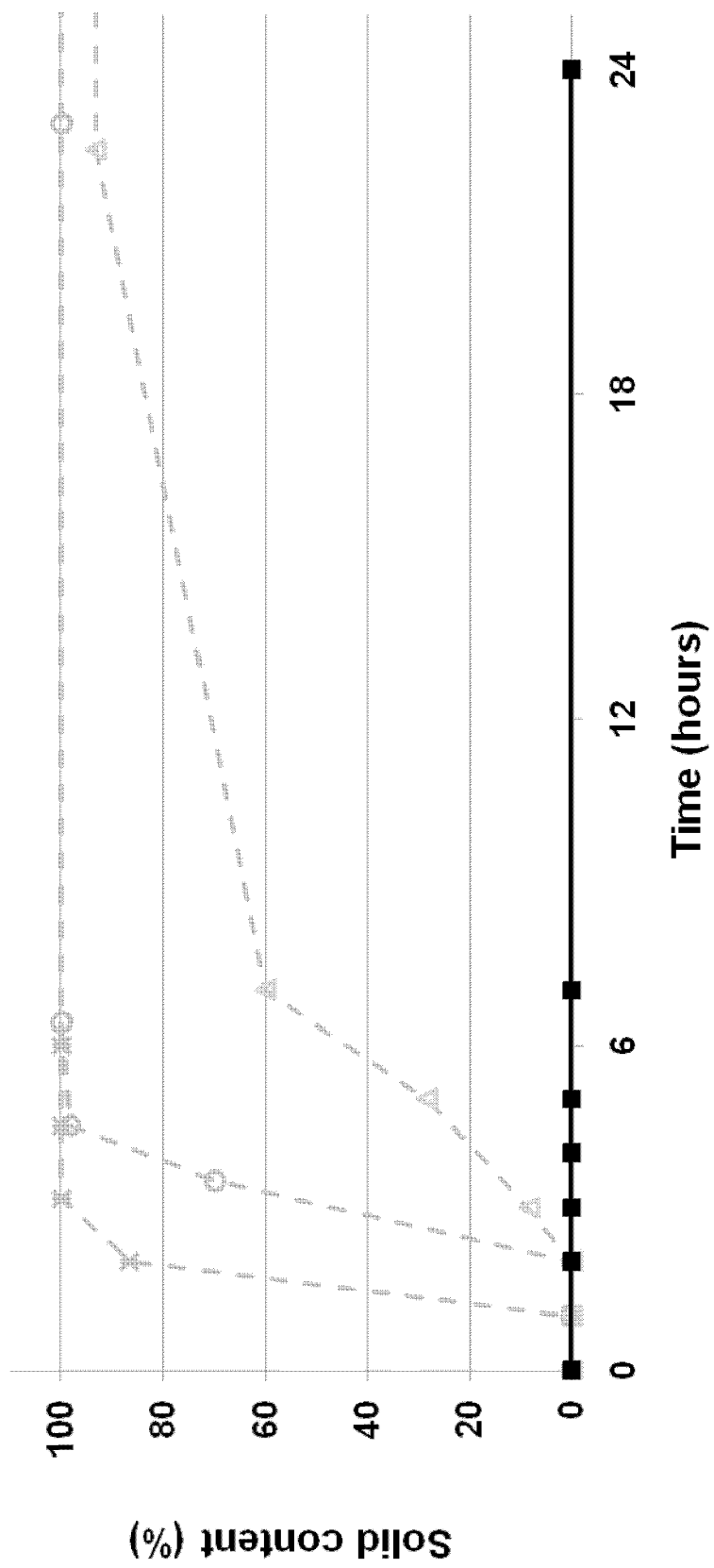
FIG. 2 is a graph showing the solid content as a function of time for Comparative Examples A, G and K, and Example 9.

The results of Comparative Examples A, G, K, and Example 9 (see Table 2) can be found in FIG. 2, with

| A | -*- | representing no additives |
| G | -○- | representing 1000 ppm RM |
| K | -Δ- | representing 1000 pm SP |
| 9 | -■- | representing 1000 ppm RM + 1000 ppm SP |

Figure 3:
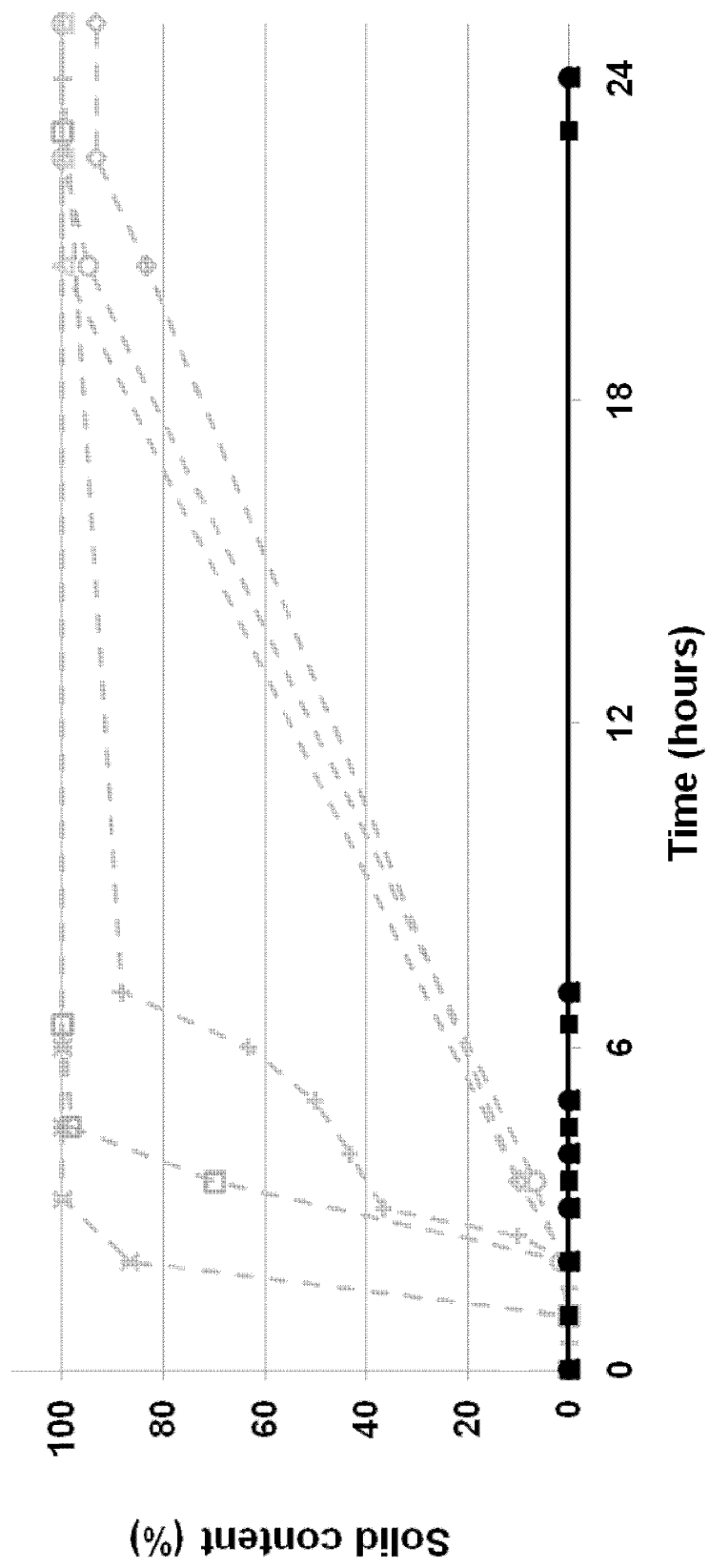
FIG. 3 is a graph showing the solid content as a function of time for Comparative Examples A, D, I, J, K and L, and Examples 1, 2, 3 and 4.

The results of Comparative Examples A, D, I, J, K, L and Examples 1, 2, 3, and 4 (see Table 2) can be found in FIG. 3, with

TABLE 4

| Ex. | Composition | | Data | | | | | | | | | | | |
|---|---|---|---|---|---|---|---|---|---|---|---|---|---|---|
| M | 10 ppm SC | Time (h) | 0 | 1 | 2 | 3 | 4 | 6 | 8 | 24 | | | | |
|   |  | Solids (%) | 0 | 0 | 43 | 43 | 47 | 50 | 53 | 100 | | | | |
| N | 100 ppm SC | Time (h) | 0 | 1 | 2 | 3 | 5 | 6 | | | | | | |
|   |  | Solids (%) | 0 | 0 | 73 | 98 | 100 | 100 | | | | | | |
| O | 1000 ppm SC | Time (h) | 0 | 1 | 2 | 3 | 5 | 6 | | | | | | |
|   |  | Solids (%) | 0 | 0 | 63 | 75 | 95 | 100 | | | | | | |
| P | 10000 ppm SC | Time (h) | 0 | 2 | 3 | 4 | 6 | 7 | 8 | 72 | | | | |
|   |  | Solids (%) | 0 | 2 | 33 | 37 | 67 | 83 | 87 | 100 | | | | |
| 11 | 10 ppm EW + | Time (h) | 0 | 1 | 2 | 3 | 19 | 20 | 21 | 96 | | | | |
|   | 1000 ppm SC | Solids (%) | 0 | 0 | 0 | 0 | 0 | 0 | 0 | 0 | | | | |
| 12 | 100 ppm EW + | Time (h) | 0 | 2 | 3 | 4 | 5 | 7 | 24 | 26 | 29 | 31 | 48 | 53 | 72 |
|   | 1000 ppm SC | Solids (%) | 0 | 0 | 0 | 0 | 0 | 0 | 0 | 0 | 0 | 0 | 0 | 0 | 0 |
| 13 | 1000 ppm EW + | Time (h) | 0 | 2 | 3 | 4 | 5 | 7 | 24 | 26 | 29 | 31 | 48 | 53 | 72 |
|   | 1000 ppm SC | Solids (%) | 0 | 0 | 0 | 0 | 0 | 0 | 0 | 0 | 0 | 0 | 0 | 0 | 30 |
| 14 | 10000 ppm EW + | Time (h) | 0 | 2 | 3 | 4 | 5 | 7 | 24 | 26 | 29 | 31 | 48 | 53 | 72 |
|   | 1000 ppm SC | Solids (%) | 0 | 0 | 0 | 0 | 0 | 0 | 0 | 0 | 0 | 0 | 0 | 0 | 0 |
| 15 | 1000 ppm EY + | Time (h) | 0 | 1 | 2 | 3 | 4 | 6 | 8 | 24 | | | | |
|   | 1000 ppm SC | Solids (%) | 0 | 0 | 13 | 13 | 17 | 20 | 23 | 27 | | | | |
| 16 | 1000 ppm SP + | Time (h) | 0 | 1 | 2 | 3 | 19 | 20 | 21 | 96 | | | | |
|   | 1000 ppm SC | Solids (%) | 0 | 0 | 0 | 0 | 0 | 0 | 0 | 0 | | | | |
| 17 | 1000 ppm WP + | Time (h) | 0 | 1 | 2 | 3 | 19 | 20 | 21 | 96 | | | | |
|   | 1000 ppm SC | Solids (%) | 0 | 0 | 0 | 0 | 28 | 30 | 30 | 80 | | | | |
| 18 | 1000 ppm EW + | Time (h) | 0 | 1 | 2 | 3 | 4 | 6 | 8 | 24 | | | | |
|   | 10 ppm SC | Solids (%) | 0 | 0 | 0 | 0 | 0 | 0 | 0 | 0 | | | | |
| 19 | 1000 ppm EW + | Time (h) | 0 | 1 | 2 | 3 | 4 | 5 | 7 | 24 | | | | |
|   | 100 ppm SC | Solids (%) | 0 | 0 | 0 | 0 | 0 | 0 | 0 | 0 | | | | |
| 20 | 1000 ppm EW + | Time (h) | 0 | 1 | 2 | 3 | 4 | 5 | 7 | 24 | | | | |
|   | 10000 ppm SC | Solids (%) | 0 | 0 | 0 | 0 | 0 | 0 | 0 | 0 | | | | |

| A | -*- | representing no additives |
| I | -○- | representing 10 ppm RM |
| J | -Δ- | representing 100 ppm RM |
| K | -□- | representing 1000 ppm RM |
| L | -♦- | representing 10000 ppm RM |
| D | -+- | representing 1000 ppm EW |
| 1 | -●- | representing 10 ppm RM + 1000 ppm EW |
| 2 | -▲- | representing 100 ppm RM + 1000 ppm EW |
| 3 | -■- | representing 1000 ppm RM + 1000 ppm EW |
| 4 | -♦- | representing 10000 ppm RM + 1000 ppm EW |

Figure 4:
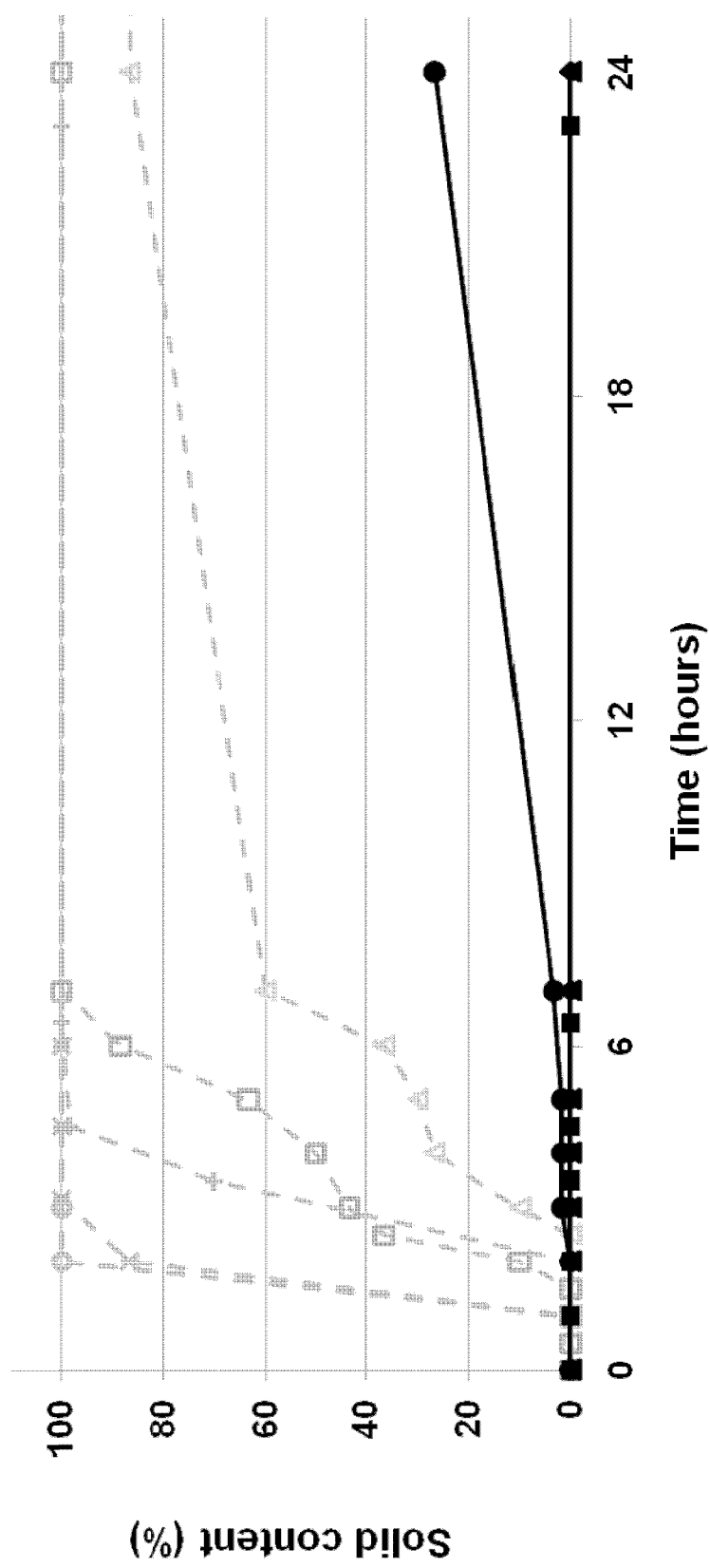
FIG. 4 is a graph showing the solid content as a function of time for Comparative Examples A, B, C, D, E and K, and Examples 3, 5, 6 and 7.

The results of Comparative Examples A, B, C, D, E, K and Examples 3, 5, 6, and 7 can be found in FIG. 4 with

| A | -*- | representing no additives |
| B | -○- | representing 10 ppm EW |
| C | -Δ- | representing 100 ppm EW |
| D | -□- | representing 1000 ppm EW |
| E | -♦- | representing 10000 ppm EW |
| K | -+- | representing 1000 ppm RM |
| 5 | -●- | representing 10 ppm EW + 1000 ppm RM |
| 6 | -▲- | representing 100 ppm EW + 1000 ppm RM |
| 3 | -■- | representing 1000 ppm EW + 1000 ppm RM |
| 7 | -♦- | representing 10000 ppm EW + 1000 ppm RM |

Figure 5:
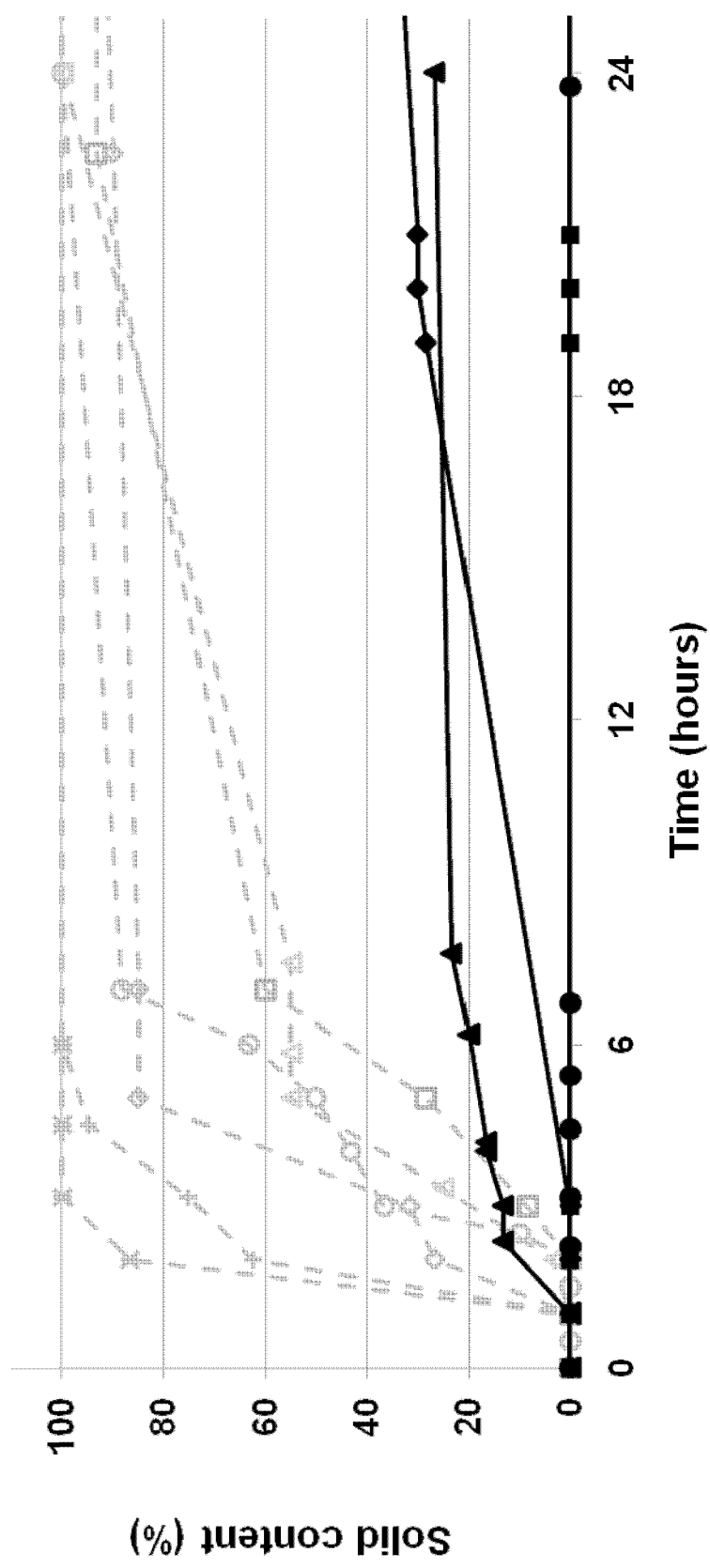
FIG. 5 is a graph showing the solid content as a function of time for Comparative Examples A, D, F, G, H and 0, and Examples 13, 15, 16 and 17.

The results of Comparative Examples A, D, F, G, H, O and Examples 13, 15, 16, 17 can be found in FIG. 5 with

| A | -*- | representing no additives |
| D | -○- | representing 1000 ppm EW |
| F | -Δ- | representing 1000 ppm EY |
| G | -□- | representing 1000 ppm SP |
| H | -♦- | representing 1000 ppm WP |
| O | -+- | representing 1000 ppm SC |
| 13 | -●- | representing 1000 ppm EW + 1000 ppm SC |
| 15 | -▲- | representing 1000 ppm EY + 1000 ppm SC |
| 16 | -■- | representing 1000 ppm SP + 1000 ppm SC |
| 17 | -♦- | representing 1000 ppm WP + 1000 ppm SC |

All Figures show the synergy between proteins and molasses. All grey dashed lines (samples containing only one component) go up quickly to 100% solid content, whereas all black solid lines (samples containing a mixture of protein and molasses) stay well below all grey dashed lines.

Proteic material naturally present in compositions comprising molasses (such as Safecote) clearly has no contribution to keeping brines liquid at very low temperatures. The addition of very little amounts of native protein (10 ppm) already leads to the synergistic effect (see Table 3, Table 4).

The invention claimed is:

1. A deicing composition comprising
(i) a deicing agent selected from the group consisting of sodium chloride, calcium magnesium acetate, calcium chloride, magnesium chloride, potassium chloride, potassium acetate, sodium acetate, sodium formate, and potassium formate,
(ii) a native protein, and
(iii) molasses
wherein the deicing agent is present in an amount of at least 5% by weight based on the total weight of the deicing composition and with the proviso that components (ii) and (iii) are not the same.

2. The deicing composition according to claim 1 wherein the native protein is selected from the group consisting of soy based proteins, dairy based proteins, egg proteins and combinations thereof.

3. The deicing composition according to claim 1 wherein the molasses is selected from the group consisting of molasses derived from corn (syrup), molasses derived from sugar beet, molasses derived from sugar cane and molasses derived from grapes.

4. The deicing composition according to claim 1 wherein the deicing composition is
an aqueous deicing composition comprising at least 5% by weight, based on the total weight of the deicing composition, of deicing agent,
a solid deicing composition comprising at least 50% by weight, based on the total weight of the deicing composition, of deicing agent, or
a deicing composition in slurry form, comprising deicing agent in an amount higher than its saturation concentration.

5. The deicing composition according to claim 1 wherein the native protein is present in an amount of between 10 ppm and 10,000 ppm and the molasses is present in an amount of between 10 ppm and 50,000 ppm.

6. The deicing composition according to claim 2 wherein the molasses is selected from the group consisting of molasses derived from corn (syrup), molasses derived from sugar beet, molasses derived from sugar cane and molasses derived from grapes.

7. The deicing composition according to claim 1 wherein the deicing agent is sodium chloride.

8. A process for preparing a deicing composition according to claim 1, the process comprising the step of spraying an aqueous treatment solution comprising the native protein and the molasses, onto the deicing agent selected from the group consisting of sodium chloride, calcium magnesium acetate, calcium chloride, magnesium chloride, potassium chloride, potassium acetate, sodium acetate, sodium formate, and potassium formate.

9. The process according to claim 8 wherein the deicing agent is sodium chloride and the native protein is present in the resulting deicing composition in an amount of between 10 ppm and 10,000 ppm and the molasses is present in the resulting deicing composition in an amount of between 10 ppm and 50,000 ppm.

10. The process according to claim 8 wherein the native protein is selected from the group consisting of soy based proteins, dairy based proteins, egg proteins and combinations thereof.

11. The process according to claim 8 wherein the molasses is selected from the group consisting of molasses derived from corn (syrup), molasses derived from sugar beet, molasses derived from sugar cane and molasses derived from grapes.

12. A process for deicing a surface, said process comprising
(i) the step of spreading the deicing composition according to claim 1 onto said surface; or
(ii) the steps of mixing a solid deicing agent selected from the group consisting of sodium chloride, calcium magnesium acetate, calcium chloride, magnesium chloride, potassium chloride, potassium acetate, sodium acetate, sodium formate, and potassium formate with an aqueous treatment solution comprising a native protein and molasses, and spreading the thus obtained mixture onto said surface, or
(iii) the steps of preparing an aqueous solution comprising between 5% by weight and the saturation concentration of a solid deicing agent selected from the group consisting of sodium chloride, calcium magnesium acetate, calcium chloride, magnesium chloride, potassium chloride, potassium acetate, sodium acetate, sodium formate, and potassium formate; a native protein and molasses and applying said mixture onto said surface, or (iv) the steps of spreading a deicing agent selected from the group consisting of sodium chloride, calcium magnesium acetate, calcium chloride, magnesium chloride, potassium chloride, potassium acetate, sodium acetate, sodium formate, and potassium formate, in solid or aqueous form onto said surface and separately spreading a native protein and molasses in solid or aqueous form onto said surface.

13. The process according to claim 12 wherein the deicing agent is sodium chloride.

14. The process according to claim 12 wherein the native protein is selected from the group consisting of soy based proteins, dairy based proteins, egg proteins and combinations thereof.

15. The process according to claim 12 wherein the molasses is selected from the group consisting of molasses derived from corn (syrup), molasses derived from sugar beet, molasses derived from sugar cane and molasses derived from grapes.

16. The process according to claim 12 wherein the surface is selected from the group consisting of non-porous asphalt road, asphalt road, porous asphalt road, concrete road, bituminous road, brick road, graveled path, cobbled road, unpaved road, and pavement.

17. The process according to claim 12 wherein between 1 and 50 g of the deicing agent, between 0.01 and 500 mg of the native protein and between 0.01 and 2,500 mg of the molasses is introduced per $m^2$ of said surface.

18. A kit of parts for use in the process according to claim 12, the kit of parts comprising an anti-icing composition comprising the deicing agent selected from the group consisting of sodium chloride, calcium magnesium acetate, calcium chloride, magnesium chloride, potassium chloride, potassium acetate, sodium acetate, sodium formate, and potassium formate as a component (a), and either (i) an aqueous solution comprising between 0% and its saturation concentration of the deicing agent, between 10 ppm and its saturation concentration of the native protein and between 10 ppm and its saturation concentration of the molasses or (ii) a solid component comprising the native protein and the molasses as a component (b).

19. The kit of parts according to claim 18 wherein component (b) is the aqueous solution comprising between 0% and its saturation concentration of the deicing agent, between 10 ppm and its saturation concentration of the native protein and between 10 ppm and its saturation concentration of the molasses, and wherein component (a) forms between 60 and 99.99% by weight of the kit of parts and component (b) forms between 0.01% and 40% by weight of the kit of parts.

20. The deicing composition according to claim 6 wherein the native protein is present in an amount of between 10 ppm and 10,000 ppm and the molasses is present in an amount of between 10 ppm and 50,000 ppm.

* * * * *